(12) United States Patent
Onishi et al.

(10) Patent No.: US 10,125,662 B2
(45) Date of Patent: Nov. 13, 2018

(54) ENGINE COOLING DEVICE FOR VEHICLE

(71) Applicant: TOYOTA JIDOSHA KABUSHIKI KAISHA, Toyota-shi, Aichi-ken (JP)

(72) Inventors: Yoichi Onishi, Okazaki (JP); Nobuharu Kakehashi, Toyoake (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 86 days.

(21) Appl. No.: 15/278,965

(22) Filed: Sep. 28, 2016

(65) Prior Publication Data

US 2017/0159545 A1 Jun. 8, 2017

(30) Foreign Application Priority Data

Dec. 7, 2015 (JP) ................................. 2015-238527

(51) Int. Cl.
*F01P 3/20* (2006.01)
*F01P 7/16* (2006.01)
(Continued)

(52) U.S. Cl.
CPC ............ *F01P 7/16* (2013.01); *B60H 1/00278* (2013.01); *B60H 1/08* (2013.01); *B60K 11/02* (2013.01); *F01P 3/20* (2013.01); *F01P 5/10* (2013.01); *F01P 11/20* (2013.01); *F01P 11/029* (2013.01); *F01P 2005/105* (2013.01); *F01P 2007/146* (2013.01); *F01P 2023/08* (2013.01); *F01P 2025/08* (2013.01); *F01P 2025/13* (2013.01);
(Continued)

(58) Field of Classification Search
CPC .... F01P 7/16; F01P 3/20; F01P 11/029; F01P 11/20; F01P 5/10; F01P 2023/08; F01P 2025/08; F01P 2025/13; F01P 2031/30; F01P 2037/02; F01P 2060/00
See application file for complete search history.

(56) References Cited

U.S. PATENT DOCUMENTS 4,669,426 A * 6/1987 Hirano ...................... F01P 11/14
123/198 DB
6,032,869 A * 3/2000 Ito ........................ B60H 1/00314
165/103
(Continued)

FOREIGN PATENT DOCUMENTS

JP 2000-257430 A 9/2000
JP 2012-193673 A 10/2012

*Primary Examiner* — Jacob Amick
*Assistant Examiner* — Charles Brauch
(74) *Attorney, Agent, or Firm* — Oliff PLC

(57) ABSTRACT

An engine cooling device for a vehicle of the present invention includes: an engine cooling circuit that circulates a cooling liquid to an engine and a heat exchanger; a reservoir tank that is connected to the engine cooling circuit, and that stores the cooling liquid to absorb pressure changes within the engine cooling circuit; at least one or more cooling liquid circulating circuits that circulates the cooling liquid to devices installed in the vehicle; a switching section that selectively switches between either of a communicating state of communicating the engine cooling circuit and the cooling liquid circulating circuit, and a cut-off state of cutting-off the engine cooling circuit and the cooling liquid circulating circuit; and a control section that, in a case in which an ignition switch is turned off, controls the switching section such that the communicating state is set.

8 Claims, 10 Drawing Sheets

(51) Int. Cl.
    *F01P 5/10*       (2006.01)
    *F01P 11/20*      (2006.01)
    *B60K 11/02*      (2006.01)
    *B60H 1/00*       (2006.01)
    *B60H 1/08*       (2006.01)
    *F01P 11/02*      (2006.01)
    *F01P 7/14*       (2006.01)
    *F02M 26/00*      (2016.01)

(52) U.S. Cl.
    CPC ....... *F01P 2025/32* (2013.01); *F01P 2031/24* (2013.01); *F01P 2031/30* (2013.01); *F01P 2037/02* (2013.01); *F01P 2060/00* (2013.01); *F01P 2060/08* (2013.01); *F01P 2060/16* (2013.01); *F02M 26/00* (2016.02)

(56) References Cited

U.S. PATENT DOCUMENTS

| | | | | |
|---|---|---|---|---|
| 6,571,752 B1* | 6/2003 | Suzuki | ............... | F01P 11/20 123/142.5 R |
| 2003/0014988 A1* | 1/2003 | Watanabe | ............... | F25B 41/04 62/201 |
| 2010/0032023 A1* | 2/2010 | Fujimoto | ............... | F02D 9/02 137/59 |
| 2011/0162601 A1* | 7/2011 | Fujiyoshi | ............... | F01L 1/3442 123/90.15 |
| 2011/0232590 A1* | 9/2011 | Benet | ............... | F01P 3/02 123/41.09 |
| 2013/0269663 A1* | 10/2013 | Nishiyama | ............... | F02M 25/07 123/568.12 |
| 2014/0041826 A1* | 2/2014 | Takeuchi | ............... | B60L 1/02 165/10 |

\* cited by examiner

ENGINE COOLING DEVICE FOR VEHICLE

CROSS-REFERENCE TO RELATED APPLICATION

This application claims priority under 35 U.S.C. 119 from Japanese Patent Application No. 2015-238527 filed Dec. 7, 2015, the disclosure of which is incorporated by reference herein.

BACKGROUND

Technical Field

The present disclosure relates to an engine cooling device for a vehicle that circulates a liquid to an engine and cools the engine.

Related Art

Japanese Patent Application Laid-Open (JP-A) No. 2000-257430 proposes a cooling device of an internal combustion engine that has a freezing prevention mechanism that, before the outside air temperature drops and cooling liquid freezes at the time when an engine is stopped, recovers some of the cooling liquid, that is within a freezing prevention tube and a water jacket, into a reservoir tank. By providing a freezing prevention mechanism in this way, damage to the engine and the circulation path of the cooling liquid and the like due to volumetric expansion caused by freezing of the cooling liquid can be prevented.

However, in JP-A No. 2000-257430, in a case of providing a cooling liquid circulating circuit that is provided so as to be able to be cut-off from an engine cooling circuit that includes the radiator and circulates the cooling water of the engine, there is room for improvement because damage due to freezing of the cooling liquid circulating circuit that has been cut-off cannot be prevented.

SUMMARY

The present invention was made in view of the above-described circumstances, and provides an engine cooling device for a vehicle that prevents damage that is due to freezing in a case in which a cooling liquid circulating circuit, that is connected to an engine cooling circulating circuit so as to be able to be cut-off therefrom, is provided.

An engine cooling device for a vehicle of a first aspect of the present invention has: an engine cooling circuit that circulates a cooling liquid to an engine and a heat exchanger; a reservoir tank that is connected to the engine cooling circuit, and that stores the cooling liquid to absorb pressure changes within the engine cooling circuit; at least one or more cooling liquid circulating circuits that circulates the cooling liquid to devices installed in the vehicle; a switching section that selectively switches between either of a communicating state of communicating the engine cooling circuit and the cooling liquid circulating circuit, and a cut-off state of cutting-off the engine cooling circuit and the cooling liquid circulating circuit; and a control section that, in a case in which an ignition switch is turned off, controls the switching section such that the communicating state is set.

In accordance with the first aspect, at the engine cooling circuit, the engine is cooled due to the cooling liquid being circulated through the engine, and the heat of the cooling liquid is dissipated due to the cooling liquid circulating through the heat exchanger.

The reservoir tank is connected to the engine cooling circuit, and cooling liquid is stored therein. Pressure changes within the engine cooling circuit are absorbed by the reservoir tank.

The switching section is switched selectively between either of the communicating state, in which the switching section communicates the engine cooling circuit and the cooling liquid circulating circuit, and the cut-off state, in which the switching section cuts-off the engine cooling circuit and the cooling liquid circulating circuit.

Further, at the control section, in a case in which the ignition switch is turned off, the switching section is controlled such that the engine cooling circuit and the cooling liquid circulating circuit are set in a communicating state. Namely, in a case in which the ignition switch is turned off, the engine cooling circuit and the cooling liquid circulating circuit are set in a communicating state, and therefore, even if freezing occurs at the cooling liquid circulating circuit, pressure due to the freezing can escape to the reservoir tank via the engine cooling circuit. Accordingly, damage, that is due to freezing in a case in which there is a cooling liquid circulating circuit that is connected to the engine cooling circuit so as to be able to be cut-off therefrom, can be prevented.

Note that, as in a second aspect of the present invention, the control section may control the switching section such that the communicating state is set, in at least one of a case in which the ignition switch is turned off and a temperature of the cooling liquid is detected to be lower than a predetermined liquid temperature threshold value, and a case in which the ignition switch is turned off and an outside air temperature is detected to be lower than a predetermined outside air temperature threshold value. Namely, control by the control section may be carried out in cases only in which there is the concern that freezing of the cooling liquid will arise.

Further, as in a third aspect of the present invention, the engine cooling device for a vehicle may further have a circulating section that circulates the cooling liquid, and, in a case in which the ignition switch is turned off, the control section may control the switching section such that the communicating state is set, and may control the circulating section such that the cooling liquid is circulated until a temperature of the cooling liquid becomes a predetermined stable state. Due thereto, in the communicating state, the engine cooling circuit portion freezing first, and thereafter, the cooling liquid circulating circuit portion freezing and pressure becoming unable to escape to the reservoir tank can be prevented. Note that, for example, a case in which it is detected that the temperature of the cooling liquid has not changed for a predetermined time can be used as the predetermined stable state. Or, a case in which a predetermined time, over which the temperature of the cooling liquid does not change even if the cooling liquid is circulated by the circulating section, elapses may be used.

Further, as in a fourth aspect of the present invention, in a case in which the ignition switch is turned on, the control section may further control the switching section to maintain the communicating state until non-freezing of the cooling liquid is detected. Due thereto, the cooling liquid freezing and the circulating circuit being damaged at the time when the ignition switch is turned on and the state transitions from the communicating state to the cut-off state, can be prevented. Note that, in this case, as in the fifth aspect of the present invention, the non-freezing of the cooling liquid may be detected on the basis of an outside air temperature, a temperature of the cooling liquid, or a driven amount at a time of driving a circulating section that circulates the cooling liquid. Here, non-freezing of the cooling liquid means a state in which the cooling liquid is not frozen, and also includes a state in which some of the cooling liquid is frozen but circulation of the cooling liquid is possible. Further, the driven amount at the time of driving the circulating section, e.g., the current value at the time of rotating a water pump that serves as the circulating section, can be used.

BRIEF DESCRIPTION OF THE DRAWINGS

Exemplary embodiments of the present invention will be described in detail based on the following figures, wherein.

DETAILED DESCRIPTION

Examples of embodiments of the present invention are described in detail hereinafter with reference to the drawings.

First Embodiment

Figure 1:
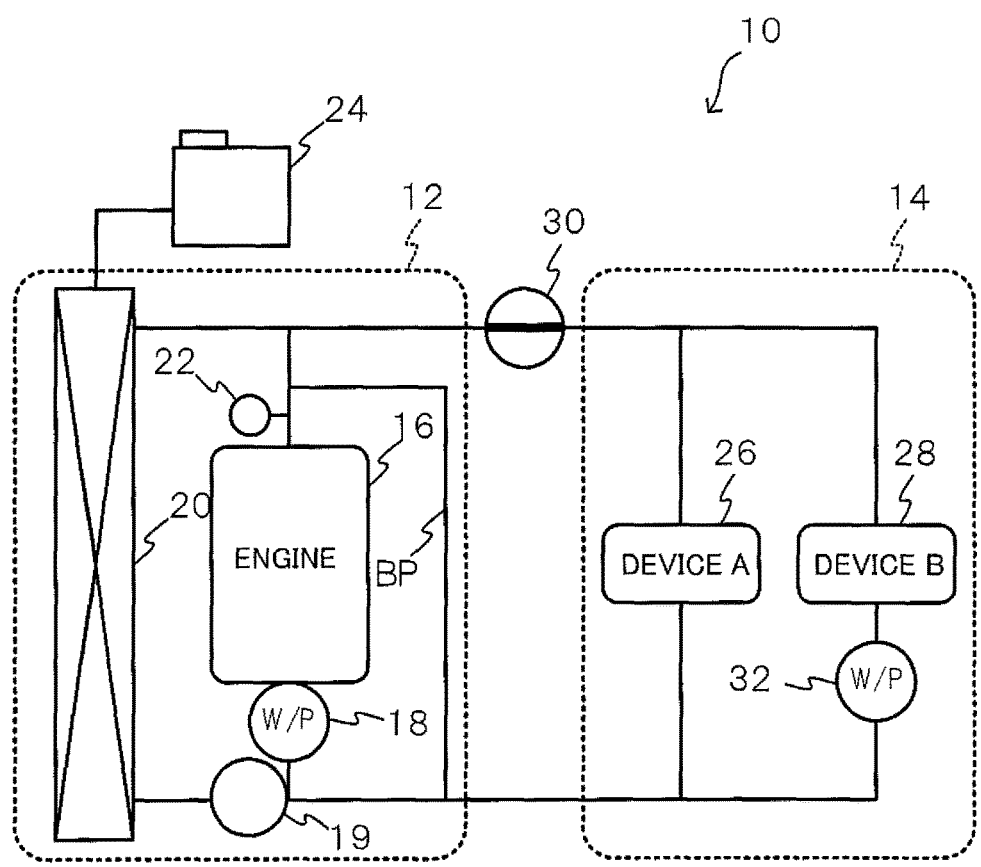
FIG. 1 is a schematic drawing showing the schematic structure of an engine cooling device for a vehicle relating to a first embodiment.

FIG. 1 is a schematic drawing showing the schematic structure of an engine cooling device for a vehicle relating to the present embodiment.

An engine cooling device 10 for a vehicle relating to the present embodiment has plural circulating circuits for circulating cooling water that serves as a cooling liquid. Concretely, the present embodiment describes an example in which, as shown in FIG. 1, the engine cooling device 10 for a vehicle has two circulating circuits that are a circulating circuit A 12 that serves as an engine cooling circuit, and a circulating circuit B 14 that serves as a cooling liquid circulating circuit.

The circulating circuit A 12 is a circulation path at which cooling water circulates through an engine 16 that serves as a heat generating body, and the cooling water is circulated by an engine water pump (W/P) 18 that serves as a circulating section. The cooling water circulates in a water jacket within the engine 16. In detail, a radiator 20, that serves as a heat exchanger that dissipates heat of the cooling water, is connected via a thermostat 19 to the circulating circuit A 12, and cooling water is circulated to the radiator 20 in accordance with the opening/closing of the thermostat 19. Namely, at less than or equal to a predetermined temperature at which cooling of the cooling water is necessary, the thermostat 19 is in a closed state, and circulation of cooling water to the radiator 20 is not carried out, and the cooling water circulates within the engine 16 by flowing through a bypass path BP. Further, in a case which the temperature of the cooling water exceeds the predetermined temperature, the thermostat 19 is opened, and cooling water is circulated to the radiator 20 and heat is dissipated. Note that a mechanical water pump, that operates due to the driving of the engine 16, or an electric water pump that operates electrically, may be used as the engine water pump 18 of the circulating circuit A 12. In the present embodiment, description is given by using an example in which an electric water pump is used. Further, for the thermostat 19 as well, an electric thermostat may be used, or a mechanical thermostat may be used.

A water temperature sensor 22 that detects the temperature of the cooling water is provided at the circulating circuit A 12. The water temperature sensor 22 is provided at, for example, the engine block, or the circulation path that is connected to the engine block, or a thermostat housing in which the thermostat 19 is housed, or the like.

A reservoir tank 24, that stores cooling water in order to absorb changes in pressure due to thermal expansion of the cooling water within the circulating circuits such as the circulating circuit A 12 and the like, is connected to the radiator 20.

On the other hand, the circulating circuit B 14 is a circulation path in which cooling water circulates through various types of devices that are installed in the vehicle, and devices that can carry out heat exchange with the cooling water are provided thereat. As shown in FIG. 1, the present embodiment illustrates an example in which two devices that are a device A 26 and a device B 28 are provided at the circulating circuit B 14. Note, for example, a heater core for heating the vehicle cabin interior, an exhaust heat recovery device, an EGR (Exhaust Gas Recirculation) cooler, a transmission (TIM) or the like can be used as the device.

Further, the circulating circuit B 14 is connected via a two-way valve 30 to the circulating circuit A 12, and the circulating circuit A 12 and the circulating circuit B 14 can be selectively switched to either of a communicating state or a cut-off state.

At the circulating circuit B 14 as well, a water pump (W/P) 32 that serves as a circulating section is provided, and the circulating of the cooling water within the circulating circuit B 14 is carried out due to the water pump 32 being driven. In particular, in a case in which the circulating circuit A 12 and the circulating circuit B 14 are set in the cut-off state by the two-way valve 30, circulating of the cooling water within the circulating circuit B 14 is carried out by the water pump 32. In a case in which the two-way valve 30 is in the communicating state, the cooling water can be circulated by the engine water pump 18, and is suffices to not drive the water pump 32.

Figure 2:
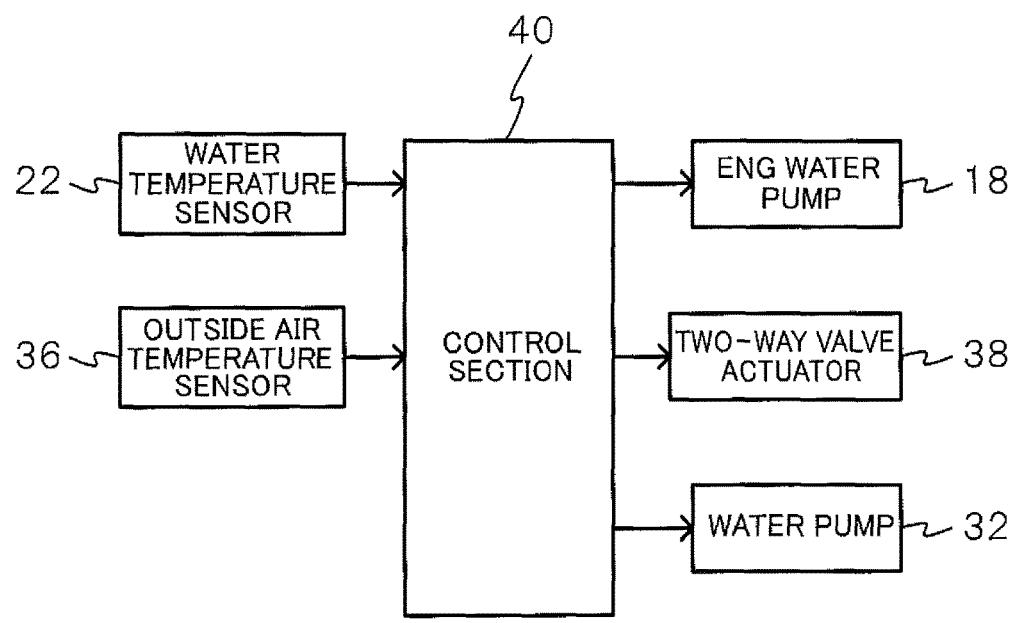
FIG. 2 is a block diagram showing the structure of a control system of the engine cooling device for a vehicle relating to the first embodiment.

The structure of the control system of the engine cooling device 10 for a vehicle relating to the present embodiment is described next. FIG. 2 is a block diagram showing the structure of the control system of the engine cooling device 10 for a vehicle relating to the present embodiment.

The engine cooling device 10 for a vehicle relating to the present embodiment has a control section 40 that carries out control of the operations of the above-described engine water pump (hereinafter called ENG water pump) 18 and the water pump 32 and the like, and the opening/closing of the two-way valve 30, and the like.

The control section 40 is structured by a microcomputer that includes, for example, a CPU (Central Processing Unit), a ROM (Read Only Memory), a RAM (Random Access Memory) and the like.

The above-described water temperature sensor 22, an outside air temperature sensor 36, the ENG water pump 18, a two-way valve actuator 38 that serves as a switching section, and the water pump 32 are connected to the control section 40. Note that the water temperature sensor 22 and the outside air temperature sensor 36 correspond to detecting sections.

The water temperature sensor 22 detects the temperature of the cooling water, and outputs the results of detection to the control section 40. The outside air temperature sensor 36 detects the outside air temperature, and outputs the results of detection to the control section 40. Note that the present embodiment illustrates an example in which the outside air temperature sensor 36 is directly connected to the control section 40, but the results of detecting the outside air temperature may be acquired via another device such as an air conditioner or the like.

As described above, the ENG water pump 18 is provided at the engine 16, and, by being driven, circulates cooling water along the circulation path.

The two-way valve actuator 38 is an actuator for driving the opening and closing of the two-way valve 30. The switching of the circulating circuit A 12 and the circulating circuit B 14 between the communicating state and the cut-off state is carried out due to the two-way valve actuator 38 being driven.

As described above, the cooling water of the circulating circuit B 14 is circulated due to the water pump 32 being driven.

On the basis of the results of detection of the water temperature sensor 22, the control section 40 controls the two-way valve actuator 38, and effects control so as to close the two-way valve 30 and set the circulating circuit A 12 and the circulating circuit B 14 in the cut-off state, in order to finish the warming-up operation at an early stage during the warming-up operation. Further, after the engine 16 has completely warmed-up and the temperature of the cooling water of the circulating circuit A 12 has risen sufficiently, the control section 40 effects control so as to open the two-way valve 30 and set the circulating circuit A 12 and the circulating circuit B 14 in the communicating state.

Because the reservoir tank 24 is connected to the circulating circuit A 12 via the radiator 20, even if, after the vehicle stops and the ignition switch is turned off, the cooling water of the circulating circuit A 12 freezes and expands, pressure escapes to the reservoir tank 24 via the radiator 20. However, in a case in which the circulating circuit B 14 is in the state of being cut-off from the circulating circuit A 12 by the two-way valve 30, if the cooling water within the circulating circuit B 14 freezes, there is the possibility that the pressure will not have a place to escape to, and damage will occur.

Thus, in the present embodiment, in a case in which the vehicle is stopped and the ignition switch is turned off, in preparation for freezing of the cooling water, the two-way valve 30 is opened, and the circulating circuit A 12, to which the reservoir tank 24 is connected, and the circulating circuit B 14 are set in the communicating state, and system operation is ended.

Further, when the circulating circuit A 12 and the circulating circuit B 14 have been set in the communicating state and system operation is ended, and thereafter, system operation is started, the control section 40 controls the driving of the two-way valve actuator 38 so as to maintain the communicating state until non-freezing of the cooling water is detected. Due thereto, when the ignition switch is turned on and the respective circulating circuits transition to the cut-off state, the cooling water freezing and the circulating circuit B 14 being damaged can be prevented. Note that, in the judgment as to whether or not the cooling water is frozen, for example, in a case in which the ENG water pump 18 is rotated when the cooling water is frozen, the current value increases, and therefore, it may be judged that the cooling water is frozen in a case in which the current value at the time when the water pump 18 is rotated is greater than a predetermined current value. Or, whether or not the cooling water is frozen may be detected from the outside air temperature or the water temperature. Further, instead of detecting the non-freezing of the cooling water, the communicating state may be maintained until the cooling water is circulated and the water temperature is stable. Here, non-freezing of the cooling water means a state in which the cooling liquid is not frozen, and also includes a state in which some of the cooling liquid is frozen and circulation of the cooling liquid is possible.

Figure 3:
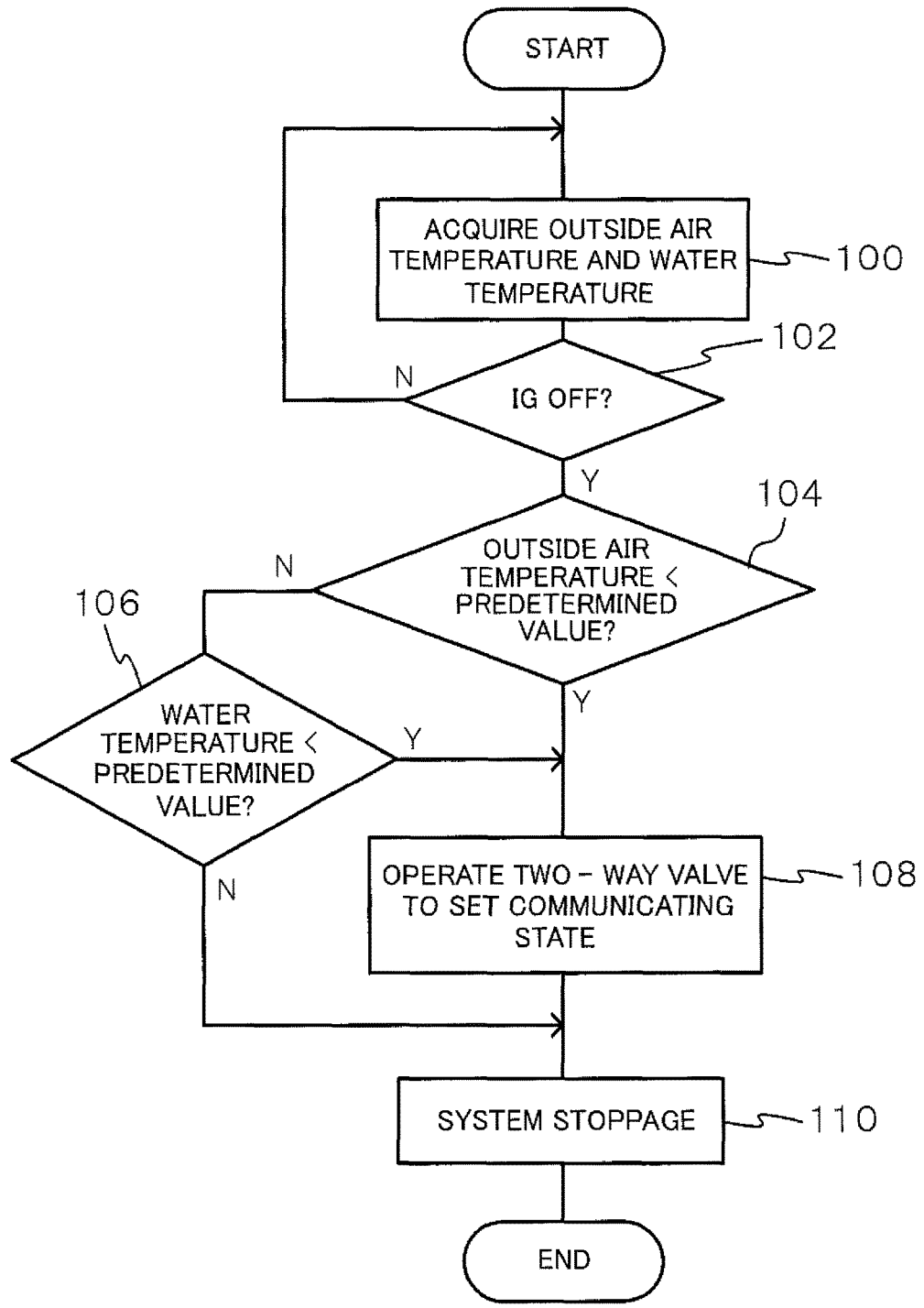
FIG. 3 is a flowchart showing some of the processings that are carried out at a control section of the engine cooling device for a vehicle relating to the first embodiment.

Concrete processing that is carried out by the control section 40 of the engine cooling device 10 for a vehicle relating to the present embodiment is described next. FIG. 3 is a flowchart showing some of the processings that are carried out at the control section 40 of the engine cooling device 10 for a vehicle relating to the present embodiment. Note that the processings of FIG. 3 are excerpts of the characteristic portions among the processings that are carried out by the control section 40.

In step 100, due to the control section 40 acquiring the results of detection of the outside air temperature sensor 36 and the water temperature sensor 22, the control section 40 acquires the outside air temperature and the water temperature, and the routine moves on to step 102.

In step 102, the control section 40 judges whether or not an unillustrated ignition switch (IG) has been turned off. If this judgment is negative, the routine returns to step 100, and the above-described processing is repeated. If this judgment is affirmative, the routine moves on to step 104.

In step 104, the control section 40 judges whether or not the outside air temperature is lower than a predetermined value. In this judgment, it is judged whether or not an outside air temperature, that is lower than a predetermined outside air temperature threshold value at which there is the concern that freezing of the circulating circuit A 12 and the circulating circuit B 14 will arise, has been detected. If this judgment is negative, the routine moves on to step 106, whereas if this judgment is affirmative, the routine moves on to step 108.

In step 106, the control section 40 judges whether or not the water temperature is lower than a predetermined value. In this judgment, it is judged whether or not a water temperature, that is lower than a predetermined water temperature threshold value at which there is the concern that freezing of the circulating circuit A 12 and the circulating circuit B 14 will arise, has been detected. If this judgment is affirmative, the routine moves on to step 108, whereas if this judgment is negative, the routine moves on to step 110.

In step 108, by driving the two-way valve actuator 38, the control section 40 effects control so as to open the two-way valve 30 and set the circulating circuit A 12 and the circulating circuit B 14 in the communicating state, and the routine moves on to step 110. Due thereto, the circulating circuit A 12 and the circulating circuit B 14 are set in the communicating state, and therefore, even if freezing of the cooling water occurs, the pressure at the time of expansion due to freezing can escape to the reservoir tank 24, and damage to the engine 16 and the circulation paths can be prevented.

In step 110, the control section 40 carries out ending processing or the like, and thereby stops the system and ends the series of processings.

In this way, in the present embodiment, in a case in which the ignition switch is turned off, the circulating circuit A 12 and the circulating circuit B 14 are set in the communicating state. Therefore, even if the cooling water freezes, pressure due to the expansion due to freezing can escape to the reservoir tank 24, and damage to the devices can be prevented.

Note that at least one of step 104 and step 106 in the above-described embodiment may be omitted. Namely, the two-way valve 30 may be set in the communicating state regardless of at least one of the outside air temperature and the water temperature in a case in which the ignition switch is turned off.

Second Embodiment

An engine cooling device for a vehicle relating to a second embodiment is described next. In the engine cooling device for a vehicle relating to the second embodiment, only the processings that are carried out at the control section 40 differ with respect to the first embodiment, and therefore, description of the structure is omitted.

In the second embodiment, after the ignition switch is turned off, the temperature of the cooling water within the circulating circuits is made uniform due to the water pumps (the ENG water pump 18 and the water pump 32) being operated. Namely, when the circulating circuit A 12 freezes first and subsequently the circulating circuit B 14 freezes, the pressure of the circulating circuit B 14 cannot escape to the reservoir tank 24. Therefore, this is prevented by making the temperature of the cooling water within the circulating circuits uniform.

Figure 4:
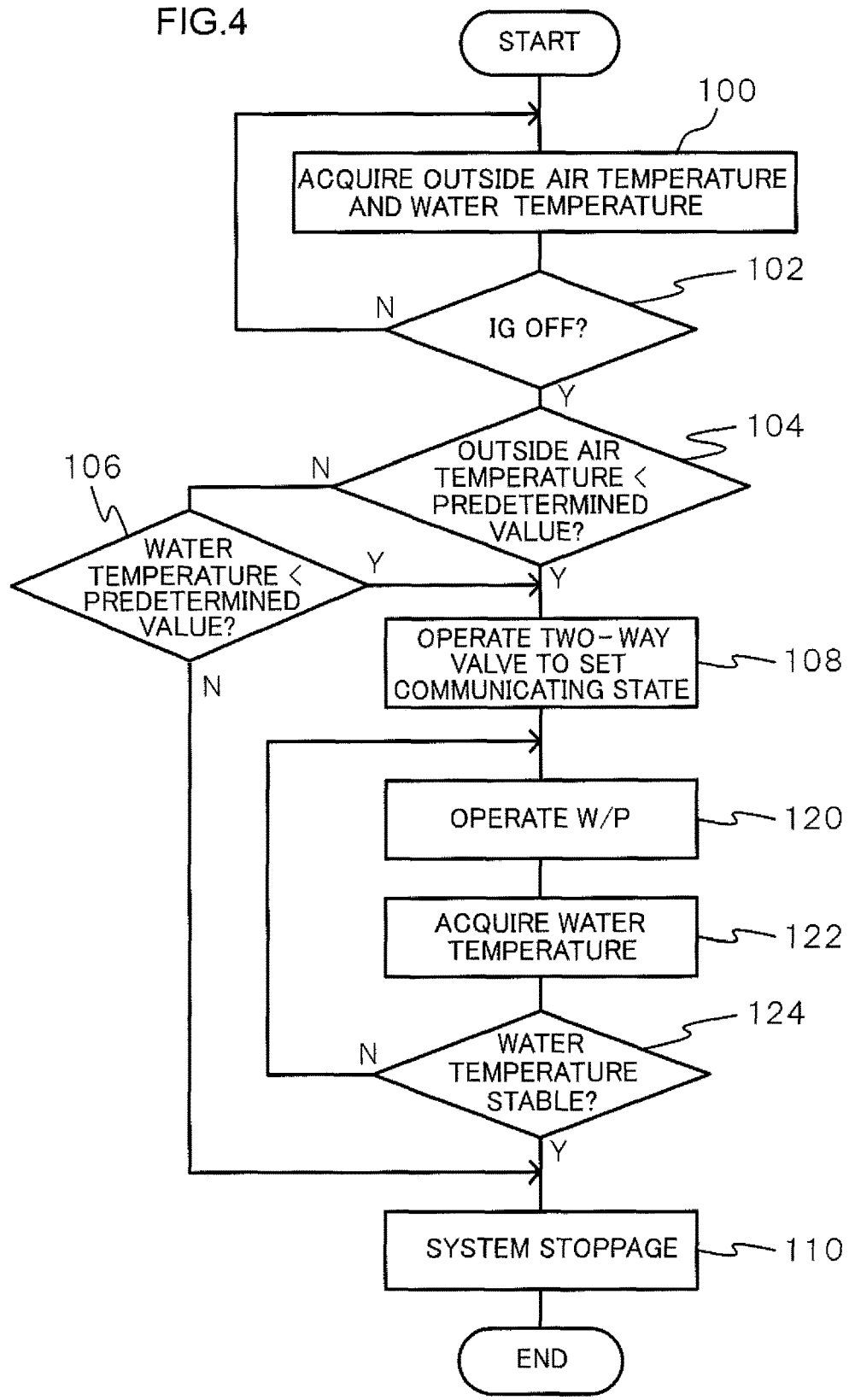
FIG. 4 is a flowchart showing some of the processings that are carried out at the control section of an engine cooling device for a vehicle relating to a second embodiment.

FIG. 4 is a flowchart showing some of the processings that are carried out by the control section of the engine cooling device for a vehicle relating to the present embodiment. Note that the processings of FIG. 4 are excerpts of the characteristic portions among the processings that are carried out by the control section 40. Further, processings that are the same as those of the first embodiment are described by being denoted by the same numerals.

In step 100, due to the control section 40 acquiring the results of detection of the outside air temperature sensor 36 and the water temperature sensor 22, the control section 40 acquires the outside air temperature and the water temperature, and the routine moves on to step 102.

In step 102, the control section 40 judges whether or not the unillustrated ignition switch (IG) has been turned off. If this judgment is negative, the routine returns to step 100, and the above-described processing is repeated. If this judgment is affirmative, the routine moves on to step 104.

In step 104, the control section 40 judges whether or not the outside air temperature is lower than a predetermined value. In this judgment, it is judged whether or not an outside air temperature, that is lower than a predetermined temperature at which there is the concern that freezing of the circulating circuit A 12 and the circulating circuit B 14 will arise, has been detected. If this judgment is negative, the routine moves on to step 106, whereas if this judgment is affirmative, the routine moves on to step 108.

In step 106, the control section judges whether or not the water temperature is lower than a predetermined value. In this judgment, it is judged whether or not a water temperature, that is lower than a predetermined temperature at which there is the concern that freezing of the circulating circuit A 12 and the circulating circuit B 14 will arise, has been detected. If this judgment is affirmative, the routine moves on to step 108, whereas if this judgment is negative, the routine moves on to step 110.

In step 108, by driving the two-way valve actuator 38, the control section 40 effects control so as to open the two-way valve 30 and set the circulating circuit A 12 and the circulating circuit B 14 in the communicating state, and the routine moves on to step 120. Due thereto, the circulating circuit A 12 and the circulating circuit B 14 are set in the communicating state, and therefore, even if freezing of the cooling water occurs, the pressure at the time of expansion due to freezing can escape to the reservoir tank 24, and damage to the engine 16 and the circulation paths can be prevented.

In step 120, the control section 40 operates the water pumps (the ENG water pump 18 and the water pump 32), and the routine moves on to step 122. Note that, in step 120, the control section 40 may effect control so as to operate at least one of the ENG water pump 18 and the water pump 32.

In step 122, due to the control section 40 acquiring the results of detection of the water temperature sensor 22, the control section 40 acquires the water temperature, and the routine moves on to step 124.

In step 124, the control section 40 judges whether or not the water temperature is stable. Concretely, by circulating the cooling water by the water pumps, the control section 40 judges whether or not the water temperature is in a predetermined stable state in which the water temperature has not changed for a predetermined time. If this judgment is negative, the routine returns to step 120, and the above-described processings are repeated. If the judgment is affirmative, the routine moves on to step 110.

In step 110, the control section 40 carries out ending processing that includes stopping of the water pumps and the like, or the like, and thereby stops the system and ends the series of processings.

In this way, in the present embodiment as well, in a case in which the ignition switch is turned off, the circulating circuit A 12 and the circulating circuit B 14 are set in the communicating state. Therefore, even if the cooling water freezes, pressure due to the expansion due to freezing can escape to the reservoir tank 24, and damage to the devices can be prevented.

Further, in the present embodiment, the water pumps are further driven, and the temperature of the cooling water is made to be uniform. Therefore, when the respective circulating circuits are in the communicating state, it is possible to prevent the circulating circuit A 12 portion from freezing first, and thereafter, the circulating circuit B 14 portion from freezing and the pressure becoming unable to escape.

Note that at least one of step 104 and step 106 in the above-described embodiment may be omitted. Namely, in a case in which the ignition switch is turned off, the two-way valve 30 may be set in the communicating state and the water pumps may be operated regardless of at least one of the outside air temperature and the water temperature.

Further, in the present embodiment, in step 124, the water temperature is detected and it is judged whether or not the water temperature is stable. However, the present invention is not limited to this. For example, the water pumps may be driven for a predetermined time by determining, in advance and by experimentation or the like, the time until the water temperature is stable, and judging whether or not that time has elapsed.

Third Embodiment

Figure 5:
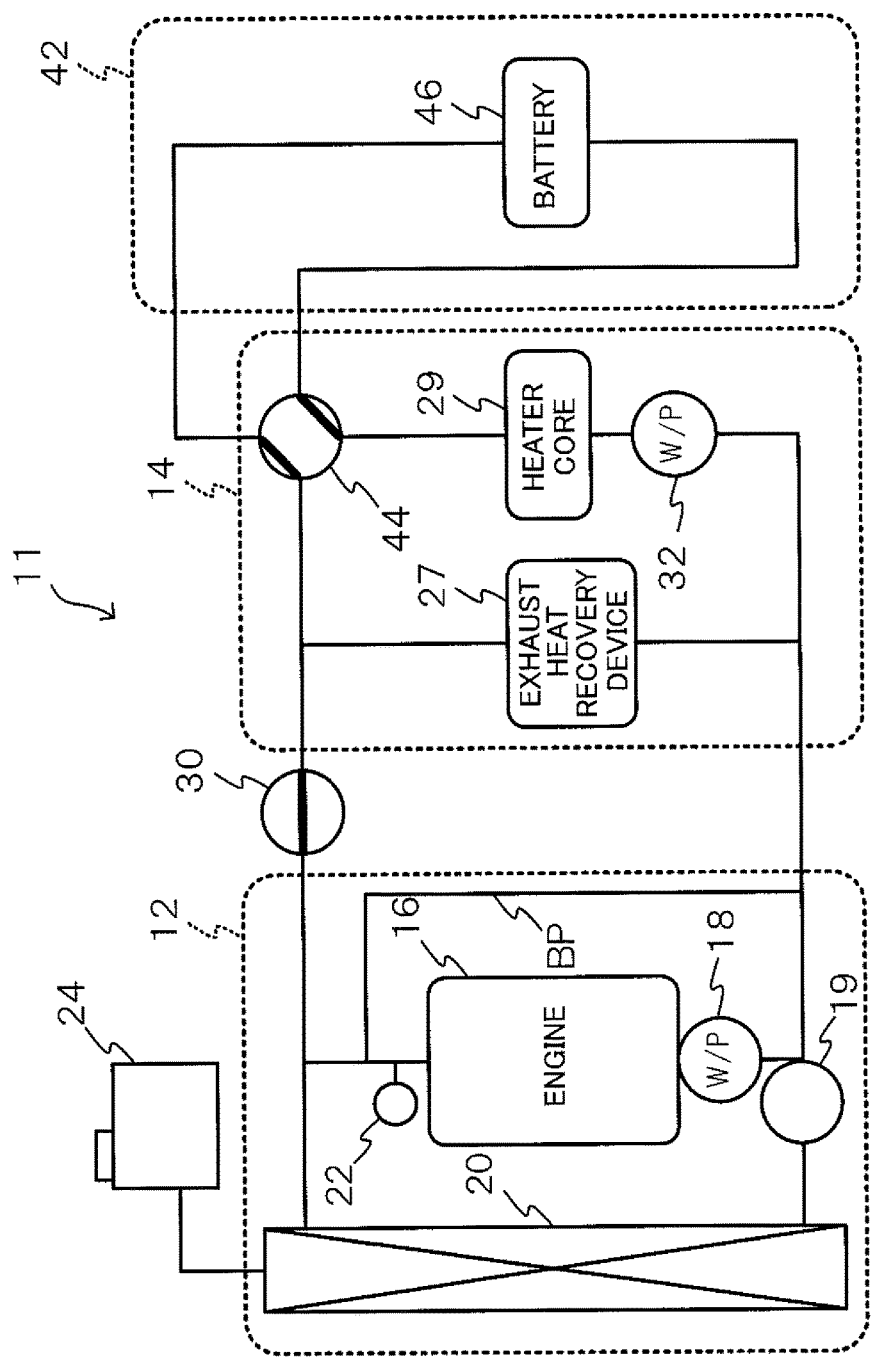
FIG. 5 is a schematic drawing showing the schematic structure of an engine cooling device for a vehicle relating to a third embodiment.

An engine cooling device for a vehicle relating to a third embodiment is described next. FIG. 5 is a schematic drawing showing the schematic structure of an engine cooling device for a vehicle relating to the present embodiment. Note that structures that are the same as those of the first embodiment are denoted by the same reference numerals, and detailed description thereof is omitted.

The above-described respective embodiments describe examples in which two circulating circuits that circulate the cooling water are provided. However, the present embodiment describes an example in which three circulating circuits are provided. Namely, as shown in FIG. 5, an engine cooling device 11 for a vehicle relating to the present embodiment has the circulating circuit A 12, the circulating circuit B 14 and the circulating circuit C 42, and the circulating circuit C 42 is added as a cooling liquid circulating circuit to the above-described embodiments.

The circulating circuit A 12 is structured the same as in the above-described embodiments. At the circulating circuit B 14, an exhaust heat recovery device 27 is provided as the device A 26 of the above-described embodiments, and a heater core 29 is provided as the device B 28.

The circulating circuit C 42 is connected to the circulating circuit B 14 via a four-way valve 44 that serves as a switching section, and a battery 46 is provided on the circulation path of the cooling water. Namely, at the circulating circuit C 42, temperature adjustment of the battery 46 is possible by utilizing the heat of the cooling water. For example, when the temperature of the battery 46 is low, the battery 46 is not in an active state. Therefore, by setting the circulating circuit A 12, the circulating circuit B 14 and the circulating circuit C 42 in communicating states by the two-way valve 30 and the four-way valve 44, the temperature of the battery 46 can be raised by utilizing the heat of the cooling water. Further, in a case in which the temperature of the battery 46 becomes a temperature of an active state, heating of the battery 46 more than needed can be prevented by setting the circulating circuit B 14 and the circulating circuit C 42 in a cut-off state by the four-way valve 44. Or, in a case in which the temperature of the battery 46 becomes excessively high, the battery 46 also can be cooled by dissipating heat to the cooling water. Note that the control section 40 controls the driving of the four-way valve 44 by using an actuator, in the same way as the two-way valve 30 of the above-described embodiments.

Even in a case in which three circulating circuits are provided in this way, in the same way as in the above-described respective embodiments, in a case in which the ignition switch is turned off, if the two-way valve 30 is set in the communicating state and the four-way valve 44 also is set in the communicating state, the pressure due to the expansion due to freezing escapes to the reservoir tank 24, and damage to the devices can be prevented. With regard to the concrete processing of the control section 40, in step 108 of the above-described respective embodiments, it suffices for the control section to control the actuators such that, at the time when the two-way valve 30 is set in the communicating state, the four-way valve 44 also is set in the communicating state.

Further, when the circulating circuit A 12, the circulating circuit B 14 and the circulating circuit C 42 have been set in communicating states and system operation is ended, and thereafter, system operation is started, the control section 40 may effect control so as to maintain the communicating states of the respective circulating circuits until non-freezing of the cooling water is detected, as described above.

Figure 6:
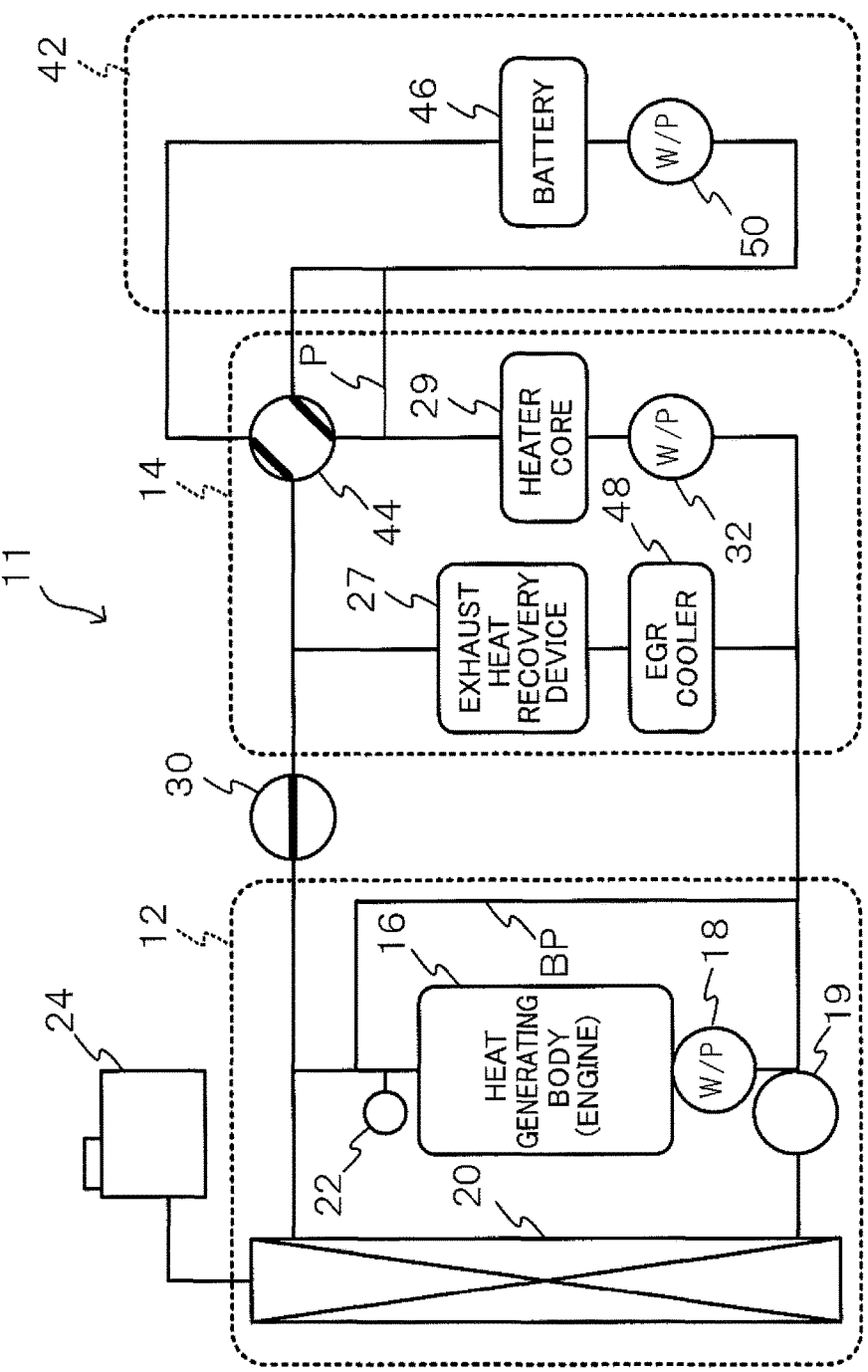
FIG. 6 is a schematic drawing showing the schematic structure of a modified example of the engine cooling device for a vehicle relating to the third embodiment.

Note that, in the third embodiment, as shown in FIG. 6, an EGR cooler 48 may be further provided at the circulating circuit B 14, and a water pump 50 that serves as a circulating section may be further provided at the circulating circuit C 42. Further, in FIG. 6, in accordance with the addition of the water pump 50, a communication path P also is added for pressure adjustment of the circulating circuit C 42. By adding the water pump 50 in this way, also at times when the circulating circuit C 42 is cut-off from the circulating circuit B 14, cooling water can be circulated to the battery 46, and the internal temperature of the battery 46 can be made to be uniform. Further, in a case in which the water pump 50 is further provided and the cooling water is circulated when the ignition is off as in the second embodiment, the water pump 50 may or may not be operated.

Fourth Embodiment

Figure 7:
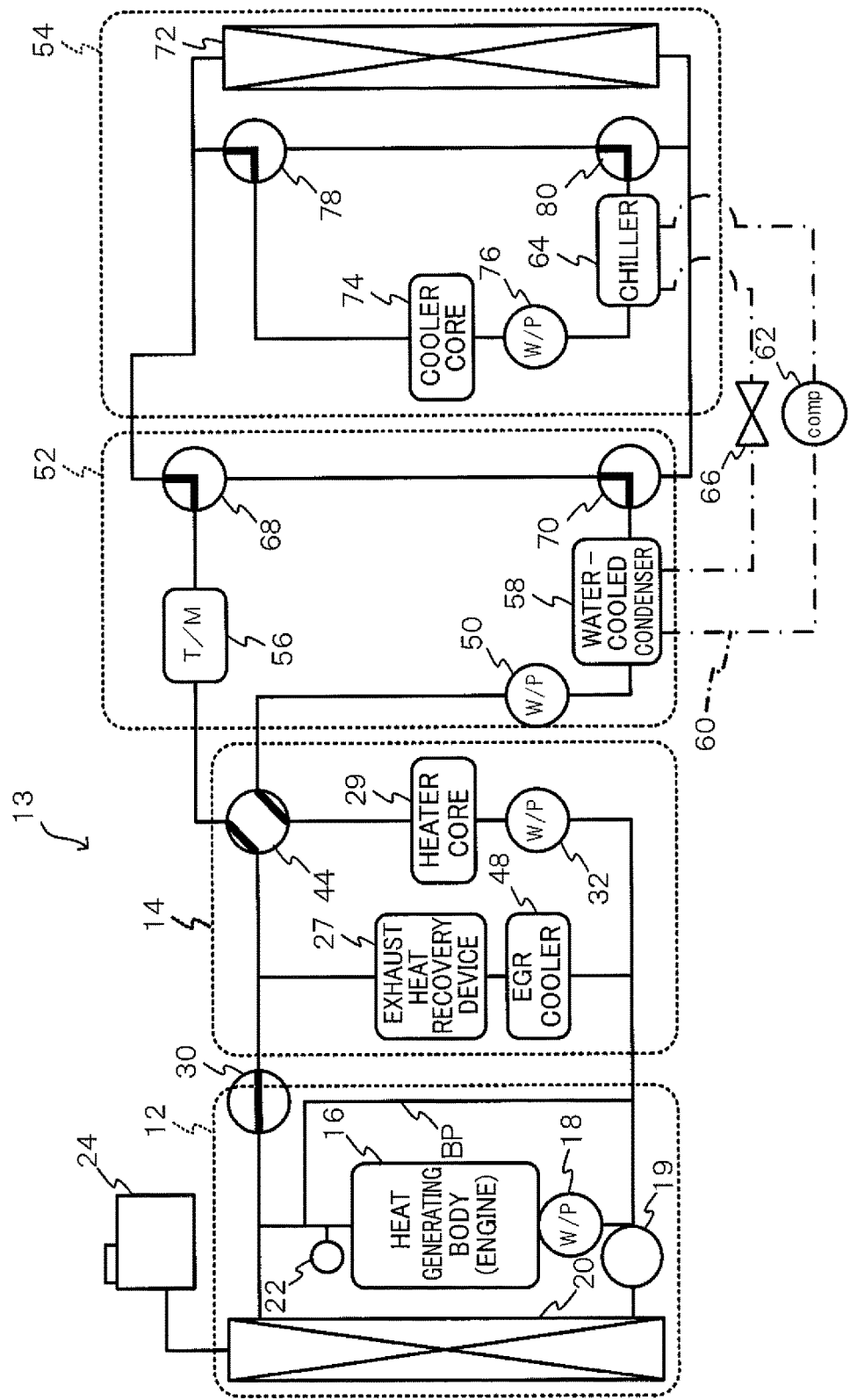
FIG. 7 is a schematic drawing showing the schematic structure of an engine cooling device for a vehicle relating to a fourth embodiment.

An engine cooling device for a vehicle relating to a fourth embodiment is described next. FIG. 7 is a schematic drawing showing the schematic structure of an engine cooling device for a vehicle relating to the present embodiment. Note that structures that are the same as those of the first embodiment are denoted by the same reference numerals, and detailed description thereof is omitted.

An engine cooling device 13 for a vehicle relating to a fourth embodiment is an example in which four circulating circuits through which cooling water circulates are provided. As shown in FIG. 7, the circulating circuit A 12, the circulating circuit B 14, a circulating circuit C 52, and a circulating circuit D 54 are provided. Namely, the circulating circuit C 52 and the circulating circuit D 54 are added to the first and second embodiments as cooling liquid circulating circuits.

The circulating circuit A 12 has the same structure as in the above-described respective embodiments, and the circulating circuit B 14 has a similar structure as in the modified example (FIG. 6) of the third embodiment.

The circulating circuit C 52 is connected to the circulating circuit B 14 via the four-way valve 44. A transmission (T/M) 56, a water-cooled condenser 58, and the water pump 50 are provided at the circulating circuit C 52.

The T/M 56 is the transmission of the vehicle, and temperature adjustment thereof is made possible by the cooling water. Further, the water-cooled condenser 58 is a heat exchanger that is included in a refrigerant cycle 60. The refrigerant cycle 60 includes a compressor 62, a chiller 64, the water-cooled condenser 58 and an expansion valve 66. Namely, due to a refrigerant being circulated while the refrigerant is compressed by the compressor 62 and the refrigerant is expanded by the expansion valve 66, the heat of the compressed refrigerant is dissipated at the water-cooled condenser 58 and the cooling water is heated, and the cooling water is cooled due to heat being absorbed by the expanded refrigerant at the chiller 64.

The circulating circuit D 54 is connected to the circulating circuit C 52 via two three-way valves 68, 70. A second radiator 72, a cooler core 74, the above-described chiller 64, and a water pump 76 that serves as a circulating section are provided at the circulating circuit D 54.

Further, at the circulating circuit D 54, a three-way valve 78 is further provided between the cooler core 74, the three-way valve 68 and the second radiator 72, and a three-way valve 80 is provided between the chiller 64, the three-way valve 70 and the second radiator 72.

Note that the respective valves (the four-way valve 44 and the three-way valves 68, 70, 78, 80) corresponds to the switching sections, and, in the same way as the two-way valve 30, are driven by actuators (not illustrated), and the operations of the actuators are controlled by the control section 40.

Further, FIG. 7 is a drawing in which the radiator 20 and the second radiator 72 are provided at opposite sides. However, in actuality, the second radiator 72 is provided at the windward side of the radiator 20, and cooling wind passes-through the second radiator 72 and the radiator 20 in that order.

Figure 8:
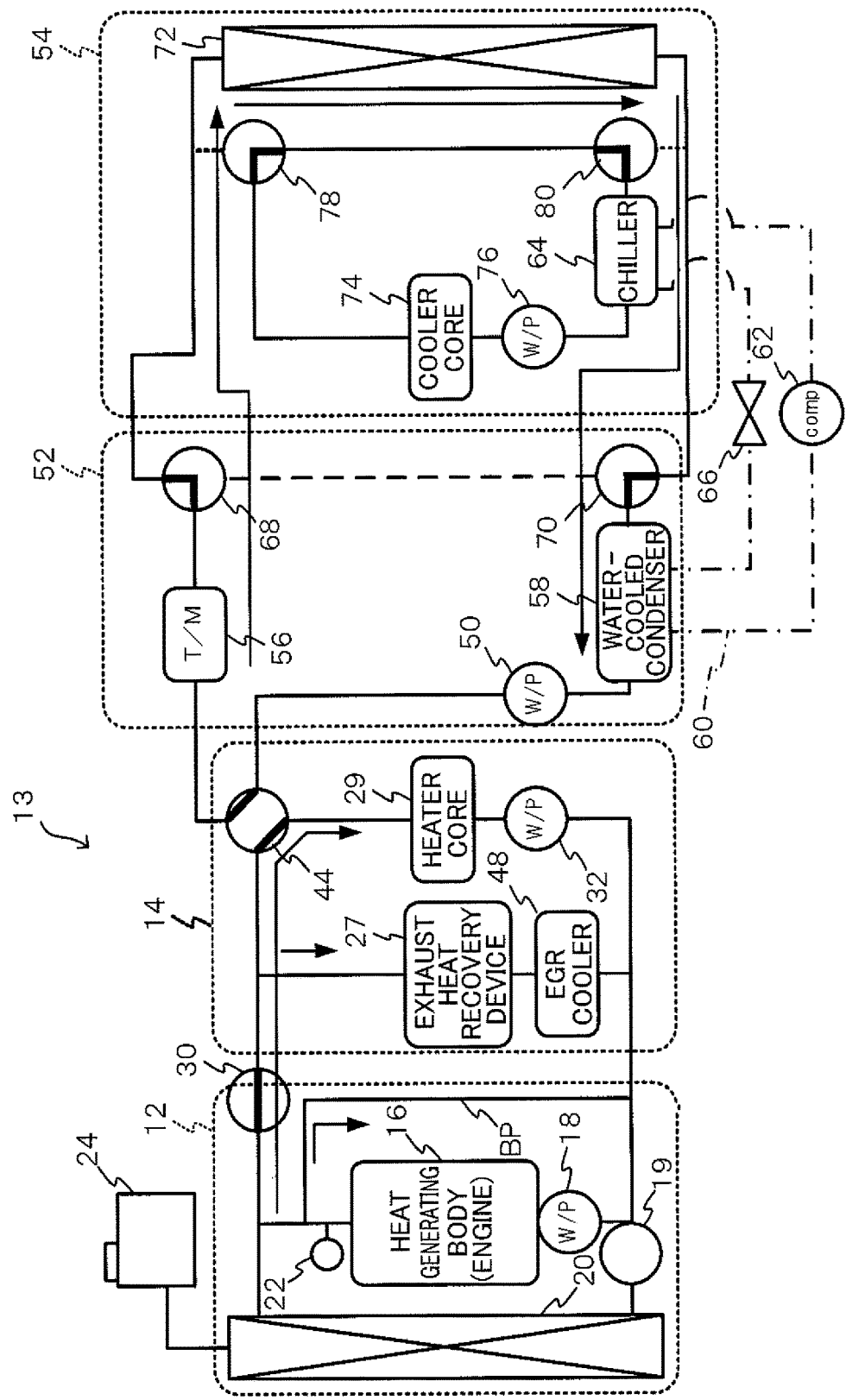
FIG. 8 is a drawing showing an operational example during a cooling operation of the engine cooling device for a vehicle relating to the fourth embodiment.

Operational examples of the engine cooling device 13 for a vehicle relating to the fourth embodiment are described. FIG. 8 is a drawing showing an operational example during the cooling operation of the engine cooling device 13 for a vehicle relating to the present embodiment.

At the time of the cooling operation, the control section 40 controls the actuators of the respective valves such that the respective valves are set in the state shown in FIG. 8. Namely, the two-way valve 30 is opened, and cooling water passes through the two-way valve 30, and flows in parallel to the exhaust heat recovery device 27 and the heater core 29, and is sucked-in by the ENG water pump 18. In a case in which the thermostat 19 is open, the cooling water that exits from the engine 16 also flows to the radiator 20.

On the other hand, the cooling water that exits from the water-cooled condenser 58 passes-through the four-way valve 44, the T/M 56, the three-way valve 68, the second radiator 72 and the three-way valve 70, and is circulated so as to return to the water-cooled condenser 58. Due thereto, the heat that the cooling water receives at the water-cooled condenser 58 and the T/M 56 is dissipated to the outside air at the second radiator 72.

The cooling water that exits from the chiller 64 passes-through the cooler core 74, the three-way valve 78 and the three-way valve 80, and is circulated so as to return to the chiller 64. Due thereto, the air that air-conditions the vehicle cabin interior is cooled at the cooler core 74, and cold air is blown-out.

Figure 9:
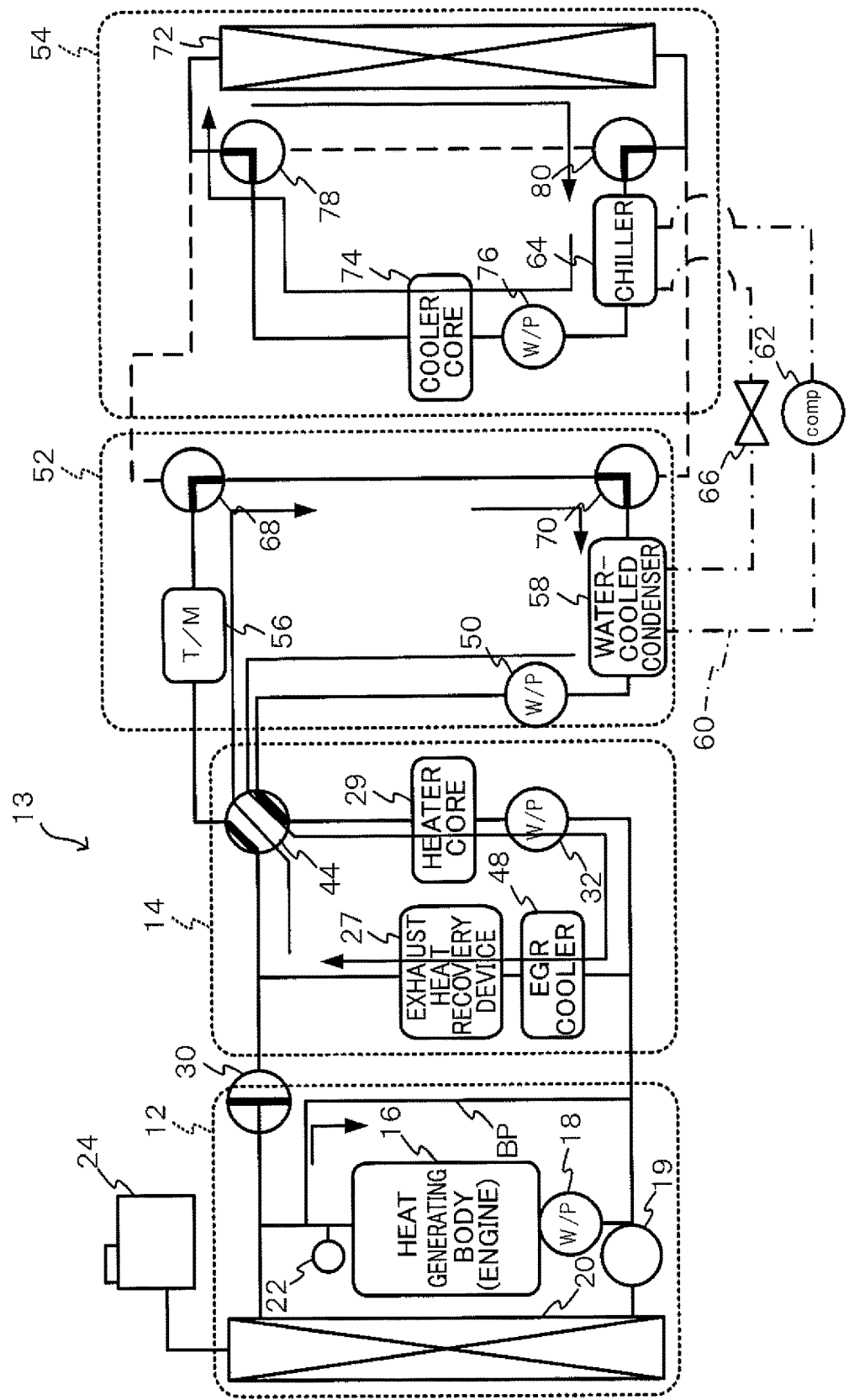
FIG. 9 is a drawing showing an operational example during a heating operation (during engine warm-up) of the engine cooling device for a vehicle relating to the fourth embodiment.

FIG. 9 is a drawing showing an operational example of the engine cooling device 13 for a vehicle relating to the present embodiment during the heating operation (during engine warm-up).

At the time of the heating operation during engine warm-up, the control section 40 controls the actuators of the respective valves such that the respective valves are set in the states shown in FIG. 9. Namely, the two-way valve 30 is closed, and the cooling water that exits from the engine 16 passes-through the bypass path 13P and is sucked-in by the ENG water pump 18. Due thereto, the cooling water of the circulating circuit A 12 is heated by the engine 16, and the warming-up operation can be completed at an early stage.

On the other hand, the cooling water that exits from the water-cooled condenser 58 passes-through the four-way valve 44, the heater core 29, the EGR cooler 48, the exhaust heat recovery device 27, the four-way valve 44, the T/M 56, the three-way valve 68 and the three-way valve 70, and is circulated so as to return to the water-cooled condenser 58.

Further, the cooling water that exits from the chiller 64 passes-through the cooler core 74, the three-way valve 78 and the second radiator 72, and is circulated so as to return to the chiller 64. At this time, at the second radiator 72, the cooling water absorbs heat from the outside air.

Figure 10:
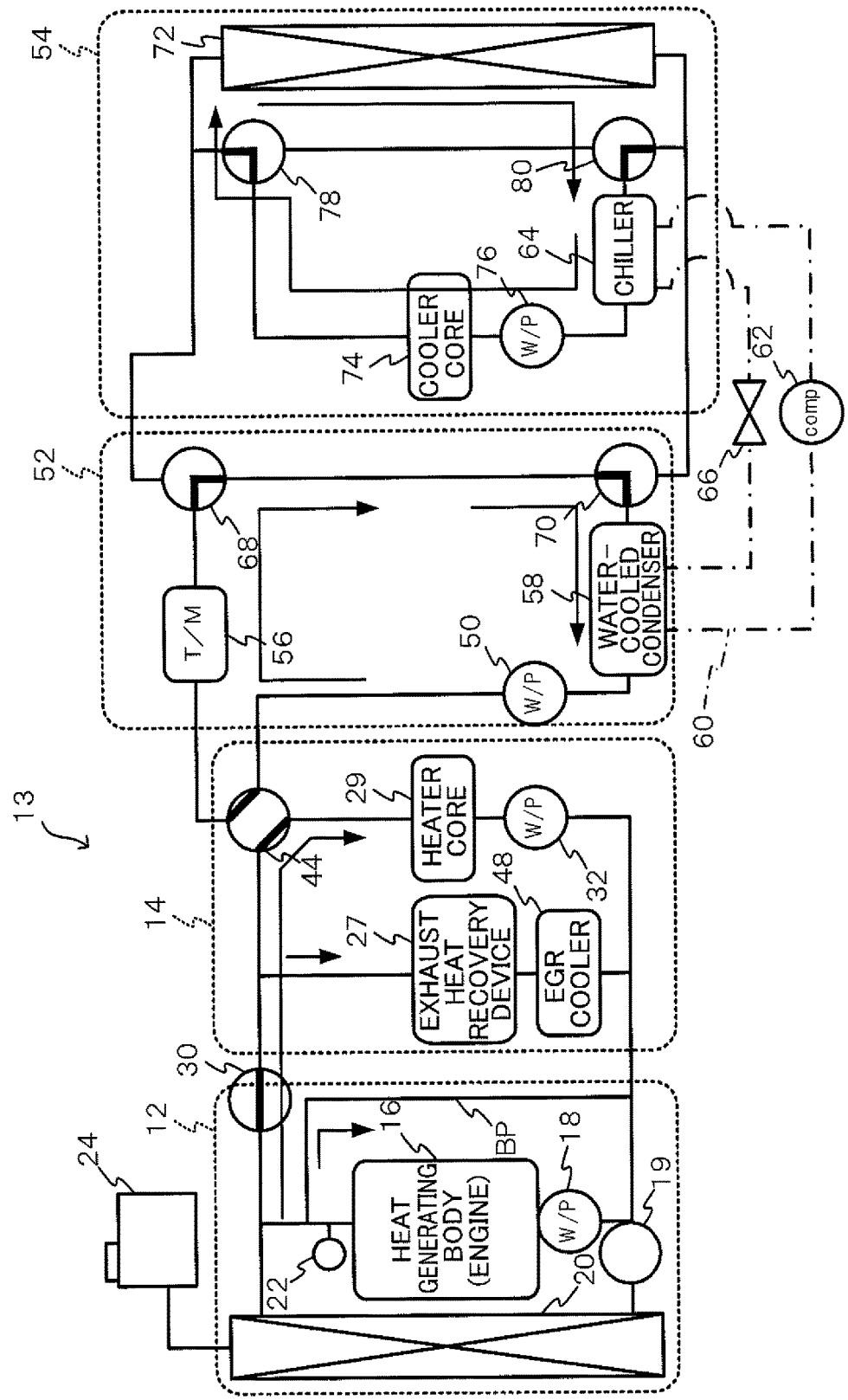
FIG. 10 is a drawing showing an operational example during the heating operation (in a case in which engine waste heat is sufficient after engine warm-up) of the engine cooling device for a vehicle relating to the fourth embodiment.

FIG. 10 is a drawing showing an operational example of the engine cooling device 13 for a vehicle relating to the present embodiment during the heating operation (a case in which engine waste heat is sufficient after engine warm-up).

At the time of the heating operation in a case in which engine waste heat is sufficient after engine warm-up, the control section 40 controls the actuators of the respective valves such that the respective valves are set in the states shown in FIG. 10. Namely, the two-way valve 30 is opened, and the cooling water passes-through the two-way valve 30 and flows in parallel to the exhaust heat recovery device 27 and the heater core 29, and is sucked-in by the ENG water pump 18.

On the other hand, the cooling water that exits from the water-cooled condenser 58 passes-through the four-way valve 44, the T/M 56, the three-way valve 68 and the three-way valve 70, and is circulated so as to return to the water-cooled condenser 58. At this time, the cooling water heats the T/M 56.

On the other hand, the cooling water that exits from the chiller 64 passes-through the cooler core 74, the three-way valve 78, the second radiator 72 and the three-way valve 80, and is circulated so as to return to the chiller 64. At this time, at the second radiator 72, the cooling water absorbs heat from the outside air.

In this structure as well, in the same way as in the above-described respective embodiments, in a case in which the ignition switch is turned off, if the control section 40 controls the actuators of the respective valves such that the respective circulating circuits communicate, the pressure due to expansion due to freezing escapes to the reservoir tank 24, and damage to the devices can be prevented. Concretely, as shown in FIG. 7, the two-way valve 30 is opened, and the four-way valve 44 is set in a state of communicating the circulating circuit B 14 and the circulating circuit C 52. Further, the three-way valve 68 is set in a state of communicating the circulating circuit D 54 with the circulating circuit B 14 via the circulating circuit C 52, and the three-way valve 70 is set in a state of communicating the flow path, that is between the three-way valve 68 and the three-way valve 70, with the water-cooled condenser 58. Further, the three-way valve 78 is set in a state of communicating the flow path, that includes the cooler core 74, with the circulating circuit C 52, and the three-way valve 80 is set in a state of communicating the flow path, that is between the three-way valve 78 and the three-way valve 80, to the chiller 64 side. Namely, the control section 40 controls the actuators of the respective valves such that all of the flow paths are in states of communicating with the reservoir tank 24. Due thereto, even if the cooling water freezes, pressure due to expansion due to freezing can escape to the reservoir tank 24, and damage to the devices can be prevented.

Further, in a case in which the ignition switch is turned off, the respective circulating circuits may be communicated, and the cooling water may be circulated as in the second embodiment. In this case, the water pumps may all be driven, but it is possible to drive only the ENG water pump 18, or to drive other water pumps.

Further, in the present embodiment as well, when the respective circulating circuits have been set in communicating states and system operation has ended, and thereafter, system operation is started, the control section 40 may effect control so as to maintain the communicating states of the respective circulating circuits until non-freezing of the cooling water is detected.

Note that the fourth embodiment describes an example in which three circulating liquid circuits are provided as the cooling liquid circulating circuits. However, even if four or more cooling liquid circuits are provided, effects that are similar to those of the above-described respective embodiments are obtained if all of the circulating liquid circuits are set in communicating states in a case in which the ignition switch is turned off.

Further, the processings that are carried out at the control section 40 in the above-described embodiments may be made to be software processings that are carried out by execution of a program, or may be processings that are carried out by hardware. Or, the processings may be made to be processings that combine both software and hardware. Further, the program that is stored in the ROM can be stored on various types of storage media and distributed.

Moreover, the present invention is not limited to the above, and, other than the above, can of course be implemented by being modified in various forms within a scope that does not depart from the gist thereof.

What is claimed is:

1. An engine cooling device for a vehicle comprising:
   an engine cooling circuit that circulates a cooling liquid to an engine and a heat exchanger;
   a reservoir tank that is connected to the engine cooling circuit, and that stores the cooling liquid to absorb pressure changes within the engine cooling circuit;
   at least one or more cooling liquid circulating circuits that circulates the cooling liquid to devices installed in the vehicle;
   a switch that selectively switches between either of a communicating state of communicating the engine cooling circuit and the cooling liquid circulating circuit, and a cut-off state of cutting-off the engine cooling circuit and the cooling liquid circulating circuit; and
   a controller that, in a case in which an ignition switch is turned off, controls the switch such that the communicating state is set, wherein
   in the cut-off state, each of the cooling liquid circulating circuits circulates the cooling liquid within the each of the cooling liquid circulating circuits and the cooling liquid is kept from reaching the engine and the heat exchanger in the engine cooling circuit.

2. The engine cooling device for a vehicle of claim 1, wherein the controller controls the switch such that the communicating state is set, in at least one of a case in which the ignition switch is turned off and a temperature of the cooling liquid is detected to be lower than a predetermined liquid temperature threshold value, and a case in which the ignition switch is turned off and an outside air temperature is detected to be lower than a predetermined outside air temperature threshold value.

3. The engine cooling device for a vehicle of claim 1, further comprising:
   a pump that circulates the cooling liquid,
   wherein, in a case in which the ignition switch is turned off, the controller controls the switch such that the communicating state is set, and controls the pump such that the cooling liquid is circulated until a temperature of the cooling liquid becomes a predetermined stable state.

4. The engine cooling device for a vehicle of claim 1, wherein, in a case in which the ignition switch is turned on, the controller further controls the switch to maintain the communicating state until non-freezing of the cooling liquid is detected.

5. The engine cooling device for a vehicle of claim 4, wherein the non-freezing of the cooling liquid is detected on the basis of an outside air temperature, a temperature of the cooling liquid, or a driven amount at a time of driving a pump that circulates the cooling liquid.

6. The engine cooling device for a vehicle of claim 1, wherein
   two of the cooling liquid circulating circuits are provided, and
   one of the cooling liquid circulating circuits has a battery temperature adjustment portion on a circulation path of the cooling liquid, and is connected to the other of the cooling liquid circulating circuits via a second switch.

7. The engine cooling device for a vehicle of claim 6, wherein
   the one of the cooling liquid circulating circuits has a communication path that is connected to a water pump and to the other of the cooling liquid circulating circuits, and that adjusts pressure, and
   the other of the cooling liquid circulating circuits has an EGR cooler.

8. The engine cooling device for a vehicle of claim 1, wherein
   three of the cooling liquid circulating circuits are provided, and
   a first of the cooling liquid circulating circuits has a transmission temperature adjustment portion of the vehicle on a circulation path of the cooling liquid, and is connected to a second of the cooling liquid circulating circuits via a second switch, and
   a third of the cooling liquid circulating circuits has a second heat exchanger, that is provided on a circulation path of the cooling liquid at a windward side of the heat exchanger, and is connected to the first of the cooling liquid circulating circuits via a third switch.

* * * * *